United States Patent [19]

Lane et al.

[11] Patent Number: 5,274,239
[45] Date of Patent: Dec. 28, 1993

[54] SHIELDED DOSE CALIBRATION APPARATUS

[75] Inventors: Stephen M. Lane, Oakland; Stanley G. Prussin, Kensington; Howard Spracklen, Castro Valley, all of Calif.

[73] Assignee: Sunol Technologies, Inc., Sunol, Calif.

[21] Appl. No.: 918,368

[22] Filed: Jul. 23, 1992

[51] Int. Cl.$^5$ .................. G12B 13/00; G01T 1/24
[52] U.S. Cl. .................. 250/370.01; 250/252.1; 250/394; 250/506.1
[58] Field of Search .................. 250/506.1, 336.1, 393, 250/394, 370.01, 252.1 R

[56] References Cited

U.S. PATENT DOCUMENTS

| | | | |
|---|---|---|---|
| 3,107,299 | 10/1963 | Jachter | 250/83 |
| 3,657,541 | 4/1972 | Deutsch et al. | 250/83.3 R |
| 3,864,568 | 2/1975 | Helgesson | 250/252 |
| 3,883,738 | 5/1975 | Glover et al. | 250/303 |
| 4,084,097 | 4/1978 | Czaplinski et al. | 250/506.1 |
| 4,270,052 | 5/1981 | King | 250/432 PD |
| 4,307,713 | 12/1981 | Galkin et al. | 128/1.1 |
| 4,333,010 | 6/1982 | Miller | 252/252 |
| 4,393,864 | 7/1983 | Galkin et al. | 128/1.1 |
| 4,401,108 | 8/1983 | Galkin et al. | 128/1.1 |
| 4,506,155 | 3/1985 | Suzuki et al. | 250/252.1 |
| 4,524,279 | 6/1985 | Christianson et al. | 250/497.1 |
| 4,923,088 | 5/1990 | Tanaka et al. | 220/468 |
| 4,988,866 | 1/1991 | Westerlund | 250/252.1 |
| 5,059,797 | 10/1991 | Bukowski | 250/336.1 |

FOREIGN PATENT DOCUMENTS 3-231196  10/1991  Japan .................. 250/506.1
912204  12/1962  United Kingdom .

Primary Examiner—Carolyn E. Fields

[57] ABSTRACT

A shielded dose calibration apparatus including one or more hand-held portable shield units containing a vessel with a radioactive sample in a shielded chamber and a calibration station for calibrating the sample in the vessel without removing the vessel from the protections of the shielded chamber. The shield units include on-board detectors for measuring the radioactivity from the sample. The calibration station may include a separate controller unit and one or more base units. To calibrate a sample, the portable shield unit is placed on a base unit, which senses the presence of the shield unit. The shield unit then communicates an identification signal and the data measured by the on-board detectors to the controller unit via the base unit. Power may also be transmitted to the shield unit via the base unit, avoiding the need for an on-board power source. In another embodiment the portable shield unit may be entirely self-contained, including an on-board power source, detectors, processing electronics, and readout mechanism.

18 Claims, 5 Drawing Sheets

SHIELDED DOSE CALIBRATION APPARATUS

BACKGROUND OF THE INVENTION

The present invention relates to radiation dose calibration instrumentation for use with medical radioisotopes.

Radioisotopes are used in medicine for such purposes as diagnosing a patient's condition, imaging various organs, tumors or malignancies in the body, and providing direct therapeutic treatment of a patient's condition. Typically the radioisotope samples used for such purposes are short-lived, highly radioactive substances that are obtained on demand from a specialized radioisotope generator. The samples are produced by a radioactive decay process occurring within the generator and are prepared for extraction from the generator by various processing steps within the generator. To minimize radiation exposure of the operating personnel, the radioactive decay process and the various processing steps take place within a chamber in the radioisotope generator that is protected by a lead shield. The sample being generated is transferred to a collection vial connected to the generator by a special collection mechanism. The vial is itself usually enclosed in a small, portable shielded container that can be transported easily from the generator to the location where the sample is to be used.

When the collection vial is disconnected from the generator, but before the rapidly decaying radioisotope sample is administered to a patient or otherwise used in a procedure, the vial must be assayed to determine the quantity of contained radioactivity for calibration purposes and for compliance with standards set by the United States Food and Drug Administration the U.S Pharmacopeia, National Formulary <821>. This assay is typically performed in a separate dose calibration apparatus and may expose the operating personnel to harmful radiation. For example, in one common type of dose calibration apparatus known as a re-entry type calibrated gas ionization chamber a worker removes the collection vial from its portable shielded container, transfers the vial to an ionization chamber in the dose calibration apparatus, and, following the assay, transfers the vial back to the portable shielded unit for further processing or dispensing. During this procedure operating personnel are exposed to the radiation emanating from the unshielded collection vial, the exposure being most intense to the fingers, hands and forearms. The exposure to these body parts is usually monitored by a dosimeter placed on a finger, and it is difficult to use the exposure measured in this way to provide accurate estimates of the magnitude and dose distribution to the body parts in question. Notwithstanding the difficulty of measurement, however, the dose to these parts of the body is usually considerably greater than the whole-body dose. Furthermore, this procedure may be repeated often by a single operator for many such samples, and the risk to the practitioner from the cumulative effect may be significant.

SUMMARY OF THE INVENTION

The present invention provides a shielded dose calibration apparatus which greatly reduces the practitioner's exposure to radiation because the collection vial need never be removed from its protective shield to be calibrated.

In one embodiment of the invention the calibration apparatus includes a portable shield unit for holding the collection vial or other vessel containing a radioactive sample and a separate calibration station, detached from the portable shield unit, for processing measurement data on the radioactivity of the sample and providing calibration information. The portable shield unit includes one or more radiation detectors together with signal processing electronics and a communications assembly, which are integrally mounted within the portable shield so that the radiation from the sample may be measured without the need to open the shield unit and break the integrity of the shielding. The portable shield unit is of a size and shape that it may be carried conveniently from place to place by the user. The detached calibration station contains a counterpart communications assembly for communicating with the portable shield unit. The calibration station receives radiation data collected in the portable unit, further processes that data, and displays or otherwise records the relevant calibration information. The calibration station also communicates power to the portable shield unit for the processing electronics.

In another embodiment of the invention the calibration apparatus comprises a self-contained portable shield unit holding the collection vial or other vessel with radioactive sample, one or more radiation detectors, and a power source and calibration station as well. The on-board calibration station includes signal processing electronics for processing measurement data on the radioactivity of the sample and providing calibration information through an on-board display or read-out connection. The sample vessel, detectors, power source and electronics are geometrically arranged and integrally mounted within the portable shield unit to provide a completely self-contained unit that provides accurate calibration information without the need to open the unit, yet is nevertheless of sufficiently small size and weight that a user may conveniently carry the unit from place to place.

The present calibration apparatus is easily applied to assays of activity levels greater than about one millicurie. A single apparatus can be used with a range of isotopes and activity levels. The apparatus is readily calibrated, has a minimum effect on the size and mass of a standard shield and can be readily adapted to a range of shield designs. The apparatus significantly reduces the dose to personnel from assaying of eluate samples from radioisotope generators.

Other aspects, advantages, and novel features of the invention are described below or will be readily apparent to those skilled in the art from the following specifications and drawings of an illustrative embodiment.

DETAILED DESCRIPTION OF ILLUSTRATIVE EMBODIMENTS

Figure 1:
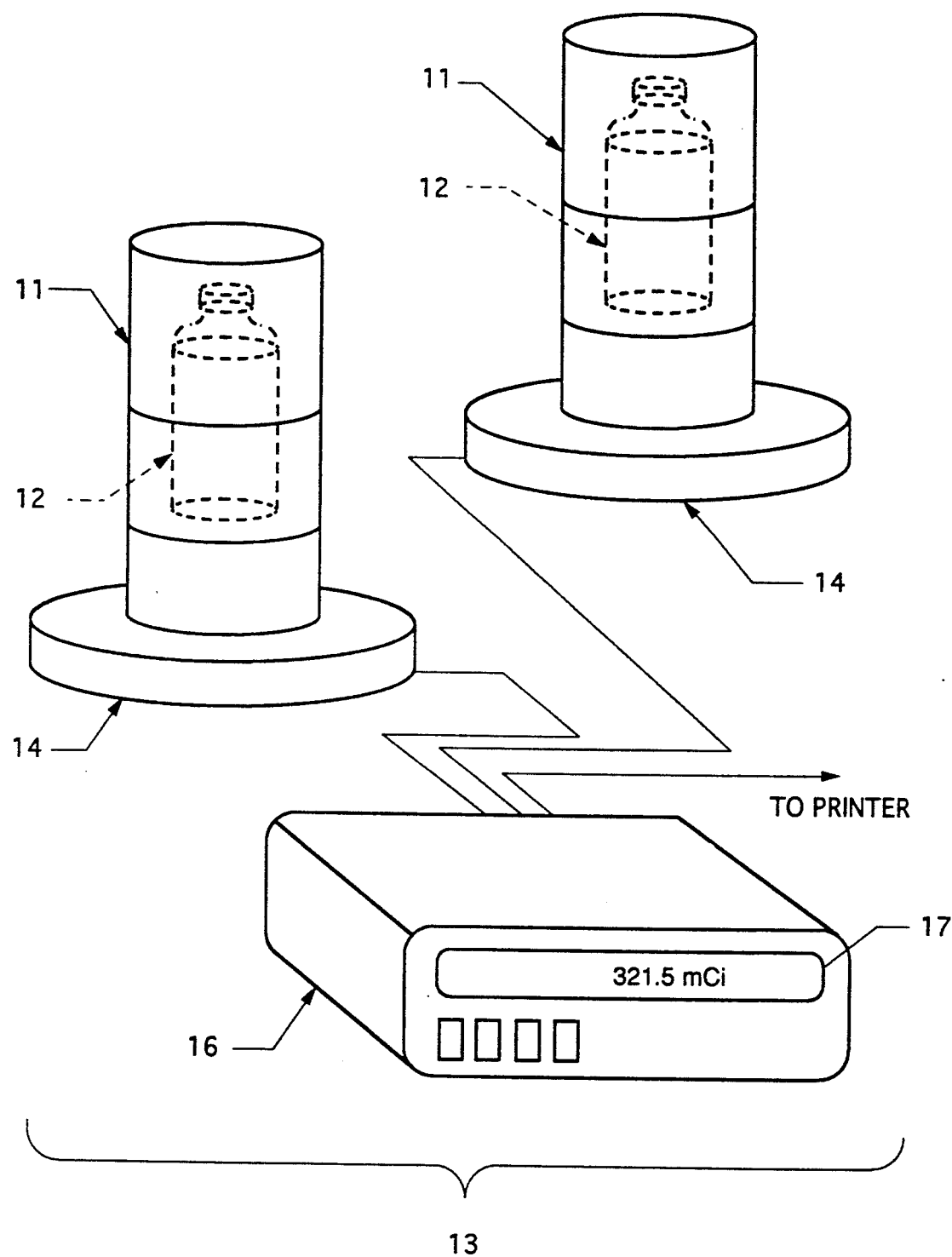
FIG. 1 is an overall perspective view of an embodiment of apparatus according to the invention.

FIG. 1 illustrates a first embodiment of calibration apparatus according to the invention, including one or more portable shield units indicated generally at 11, one or more base stations 14, and a controller unit 16. Base stations 14 and controller unit 16 taken together are referred to as the calibration station 13. As illustrated in FIG. 1, the calibration station 13 is of modular form comprising several separate base units 14 that are attached via cable to a separately housed controller unit 16. A modular construction is advantageous in that the capacity of the system may be increased readily for use in larger nuclear medicine or other facilities handling a greater volume of radioactive samples. In this way a single controller unit may be fabricated to serve small and large facilities, thereby reducing the unit cost. The calibration station may alternatively be configured in a single housing including the electronics and several base units. Because of the likely use of more than one portable shield unit with any one calibration station, it is desirable to identify each shield unit so that unit-specific calibrations may be applied. For this purpose the calibration system contains electronic circuitry, described in more detail below, for identifying each portable shield unit.

The portable shield unit 11 holds a vessel 12 containing a sample of a radioactive substance emitting characteristic gamma radiation. Vessel 12 will typically be a glass collection vial from a radioisotope generator, although other types of vessels could also be used. Each of the shield units 11 includes its own radiation detectors, electronic processing circuitry and communications circuitry, described more fully below, for measuring the radiation from the sample and communicating the measurement data to the controller unit 16 via the base unit 14. The base unit 14 contains power transmission circuitry for transmitting power to the shield unit 11 and communications circuitry that serves as a link to transfer signals from the controller unit 16 to the shield unit 11 and for transfer of signals from the base unit to the controller.

The controller unit including data communications circuitry, power communications circuitry, a microprocessor for controlling these and other operations, and an output mechanism such as an LED display for reporting the calibration information. The data communications circuitry communicates with the corresponding communications assemblies in the shield units 11 through base units 14 to cause a coded signal indicating the level of radioactivity contained within the shield unit to be transmitted to the controller. The power communications circuitry serves to power the shield units when they are in position at the base units. The microprocessor controls these functions as well as processing the signals received from shield units 11, analyzing the data from the shield units, and providing output to a display, printer, magnetic disk, remote computer or other external output device.

Figure 2:
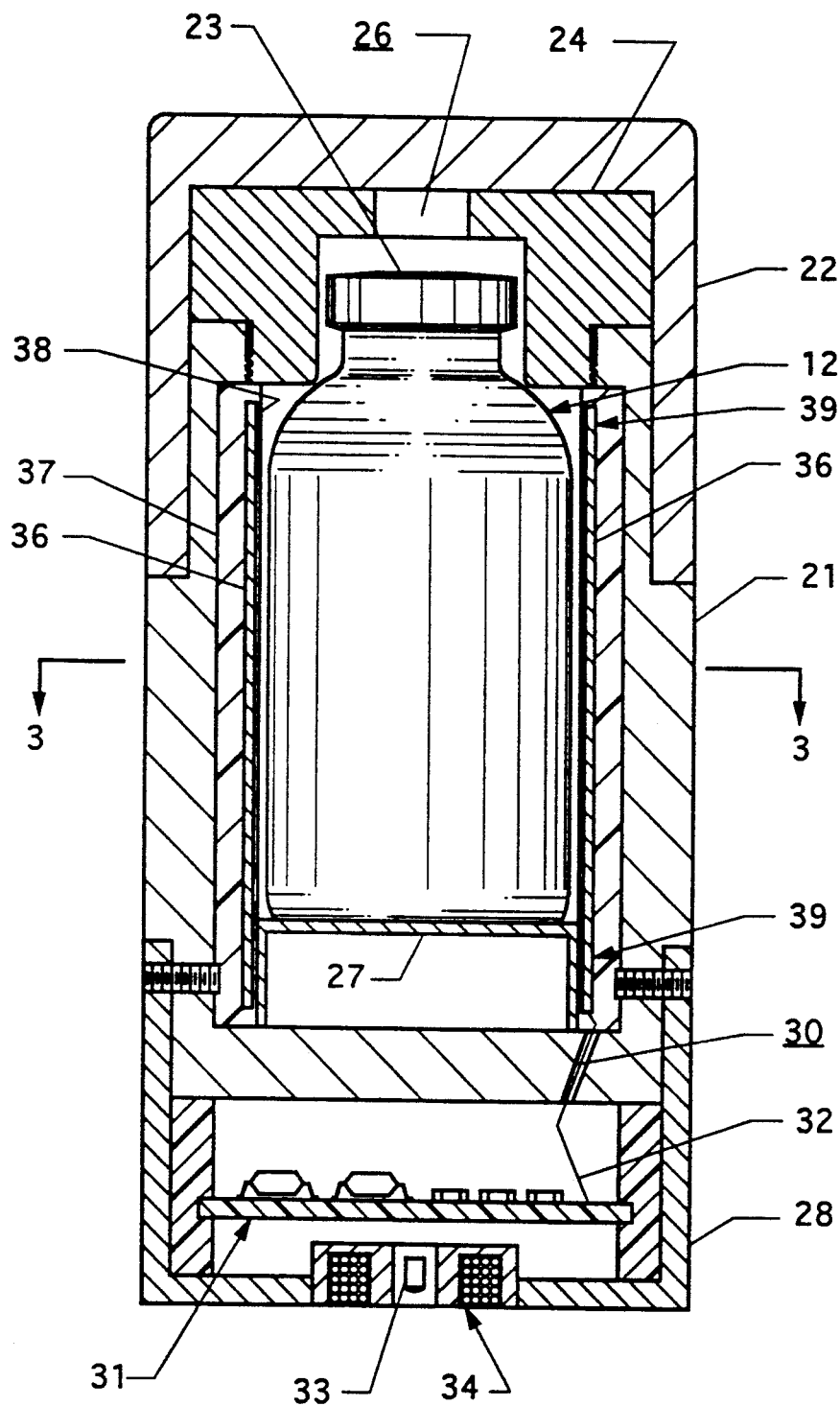
FIG. 2 is a partial cross-sectional view of an embodiment of a portable shield unit according to the invention.

FIG. 2 shows the structure of portable shield unit 11 in the illustrated embodiment. The unit includes a shield body 21, a removable shield cap 22, and a screw top 24, which together define an interior chamber for holding the vessel 12. The body, cap and screw top are formed of lead to provide the shielding action against the emissions of the radioactive sample contained in the interior chamber. Those skilled in the art will readily be able to determine the proper thickness of lead, the computation of which need not be described here. The vessel 12 illustrated in FIG. 2 is a glass collection vial of the sort commonly used to collect the radioactive sample from a radioisotope generator. The vial includes a cap with septum 23, which the practitioner penetrates with a syringe needle at the time of use. The vial is restrained from above by screw top 24, which is formed with an aperture 26 providing access to septum 23 for entry by the syringe. Because screw top 24 is formed of lead, only the narrow access aperture 26 becomes unshielded during use. The vial 12 rests on a stand 27 which sits on the bottom wall of the lead body 21. The stand is not formed of lead, but rather is formed of a material such as aluminum providing minimal attenuation of the radiation passing through it from the vial. At the bottom of the shield unit and outside the lead shield body is an aluminum housing 28 containing electronic circuitry for data collection and communications with the calibration station. In the embodiment of FIG. 2 a printed circuit board 31 with the processing circuitry is mounted in the housing 28. An infrared light-emitting diode (LED) 33 and an inductive coupling mechanism 34 are fitted into an opening in the bottom of the housing 28 for data and power communications with a base unit 14. The mechanism 34 serves as a power transducer for communicating power to the portable shield unit. It is constructed using a ferrite pot core wound with wire coils and is connected to the printed circuit board via wire leads. The LED 33 is positioned in a central opening in the coupling mechanism 34 and is used to transmit optical data signals to a photosensitive element such as a photodiode contained in the base unit.

The detectors 36 are connected to the signal processing circuitry on printed circuit board 31 by insulated wires 32. As seen in FIG. 2, a detector wire 32 is shown passing through a small cylindrical feedthrough hole 30 formed in the bottom wall of the shielded chamber. Holes 30 are oriented at such an angle or are shaped in such a way as to avoid a direct line-of-sight pathway from the radioactive sample to the exterior of the insulated chamber so as to prevent the holes from forming an unshielded pathway for radiation to escape.

The radiation detectors in the illustrated embodiment are provided by vertically extending strips of sensitive detector material 36, which are encased within a cylindrical plastic sleeve 37 surrounding vial 12. The sensitive detector material 36 may be provided, for example, by a silicon PIN junction semiconductor material. Such materials are known to those in the art and are commercially available, for example, from Hamamatsu Corporation of Hamamatsu City, Japan. Those skilled in the art will appreciate that a variety of detector materials and detector types may be used. In addition to the silicon semiconductor type detectors described herein, semiconductor detectors formed of other materials or scintillator type detectors or gas ionization type detectors may also be used. For purposes of the present invention the detector must simply be sensitive to radiation of the desired kind and in the desired range, preferably require no external bias supply to operate, and have low dark current. Those skilled in the art will readily be able to select a suitable detector material or type for the radioactive substances used in the application of interest.

Many semiconductor detectors are known to be highly sensitive to temperature variations, some even exhibiting variability over the normal range of room temperatures at which the apparatus here is intended to be used. If the selected detector material is sensitive to temperature in the indicated range of application, temperature monitoring and compensation circuitry may also be included in the shield unit.

The illustrated detector arrangement is optimized for detection of radiation from common radioisotopes normally used in nuclear medicine, for example, isotopes of technetium (Tc-99m), indium (In-111), or iodine (I-123). These radioisotopes emit gamma radiation with energies around 150 keV. The strips 36 of detector material have effective dimensions of about six centimeters by three millimeters by 300 microns and may be formed as a single piece or as two or more juxtaposed segments electrically wired together to function as a single detector strip or alternatively not wired together so as to provide independent readings from different zones. The strips are mounted to extend vertically within cylindrical plastic sleeve 37 at diametrically opposed positions about sleeve 37 as illustrated in the cross-sectional view of FIG. 3. Detector strips 36 are recessed within plastic sleeve 37 so that a portion of the sleeve forms a covering strip 38 approximately one millimeter in thickness overlying the detector strip surface facing the sample. Covering strip 38 serves to enhance the detection sensitivity of the apparatus and serves to provide a more sensitive portable shield unit without unduly increasing the size, weight or cost of the unit. This is accomplished because plastic covering strip 38 acts as an electron converter material. When radiation from the radioactive sample impinges on strip 38, a portion of the radiation undergoes the process of Compton scattering in the converter material. According to this process the impinging radiation interacts with electrons in the plastic sleeve material to give the electrons greater energy. The energetic electrons so produced, sometimes referred to as Compton electrons, then interact with the detector material 36 where they are detected more efficiently than the incident radiation that produced the Compton electrons in the first place. The incident radiation is, in effect, converted into more easily detectable intermediate electrons.

The effectiveness of the covering strip 38 as a converter has not been found to be greatly sensitive to the selection of the particular plastic, as most commonly used plastics have sufficient electron density to provide a beneficial quantity of Compton electrons. However, for radioisotopes emitting higher energy radiation, substantial increases in detector efficiency can be obtained by using converter materials with higher atomic number. For Tc-99m, for example, roughly one-third of the signal generated by detector strips 36 is due to Compton electrons from the converter material, and the remaining two-thirds of the signal is due to direct interaction of radiation from the sample with the detector strip material 36. At higher energy of emitted radiation a greater fraction of the detected signal comes from the detected Compton electrons. The use of the intermediate external converter material 38 thus can significantly lower the limit of detectable radioactivity from the sample.

Detector strips 36 may be advantageously mounted to extend vertically above and below the liquid level in the vial as indicated at reference numeral 39 in FIG. 2 so that the effective solid angle subtended by the liquid sample is approximately constant for the range of liquid volumes intended to be used in the apparatus. By extending the detector strips vertically above and below the spatial extent of the vial, the detection efficiency is made relatively insensitive to the position of the liquid in the vial. A purpose of stand 27 supporting vial 12 is to allow detector strips 36 to extend a sufficient distance below vial 12 to increase the subtended solid angle and achieve the desired volume insensitivity. It is important that the stand be fabricated of a material and thickness that will not significantly attenuate the downwardly directed radiation from the vial. In the illustrated embodiment, for example, stand 27 is fabricated of aluminum of roughly one millimeter thickness. Such a stand has been determined to cause attenuation of less than one percent with radiation of energy 148 keV.

Figure 3:
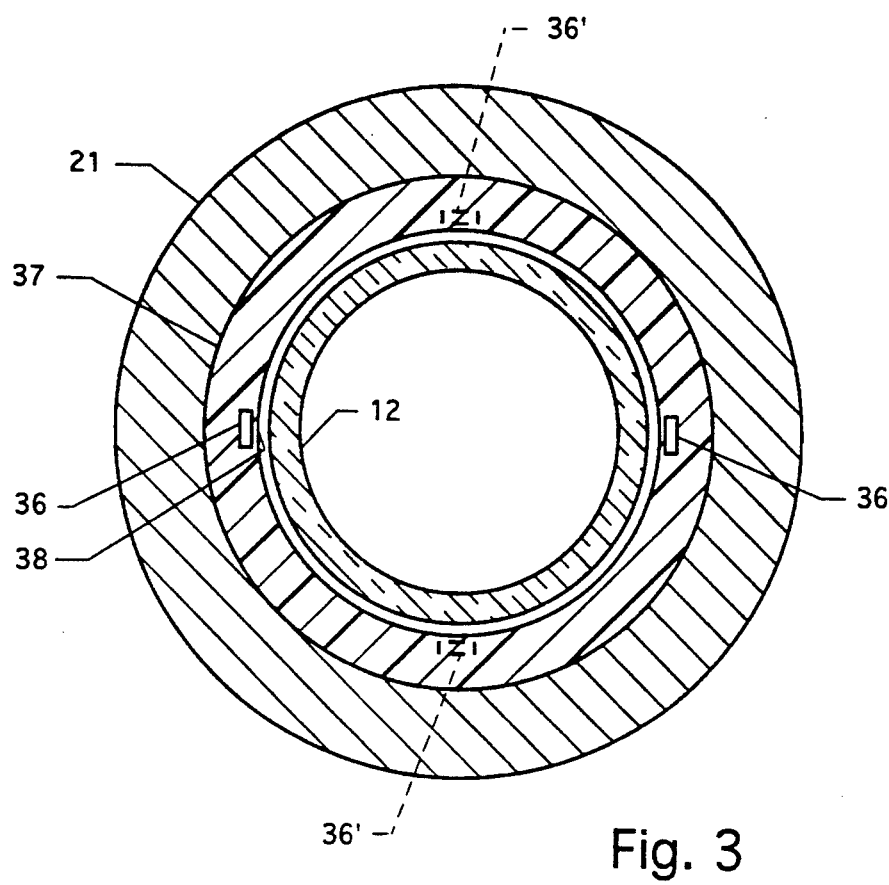
FIG. 3 is a cross-sectional view of the portable shield unit taken along the line 3—3 of FIG. 2.

As seen in FIG. 3, at least two detector strips 36 are positioned diametrically opposed to one another to account for deviations from perfect cylindrical symmetry in the apparatus and in the sample vial. Such deviations from cylindrical symmetry arise from a number of sources. In practice, vials 12 from different manufacturers may vary in such characteristics as their external dimensions or thickness of the glass. The interior chamber of the shield unit is thus provided with clearance for different vials so that the precise lateral position of a given vial may vary within this clearance. In addition, the inner surfaces of the vials may not be completely wetted by the contained liquid so that droplets may stick non-uniformly about the surface. Because of the resulting deviation from cylindrical symmetry, detectors placed at different positions about the circumference of plastic sleeve 37 will receive slightly different exposures from the radiation. The use of two diametrically opposed strips provides for averaging the signals to correct for the above sources of variability in the received radiation. While a detector "strip" shaped to form a cylinder surrounding the vial would best account for the asymmetry, acceptable relative calibration accuracy may be provided at a lower cost with only two diametrically opposed strips. The number of detector strips 36, of course, need not be limited to two. Additional discrete strips may be distributed about the circumference of vial 12 as illustrated in phantom at reference numeral 36' in FIG. 3. A greater number of detector strips at other angles about plastic sleeve 37 will improve the accuracy of measurement, although at higher cost. Notwithstanding these considerations, in applications where deviations from cylindrical symmetry need not be considered, a single radiation detector will suffice.

When the radioactive sample is initially prepared in a radioisotope generator, it is collected in a collection vial which is situated in a portable shield unit 11 of the present invention in the same manner as collection vials are situated in conventional shielding units. Unlike conventional units, however, the portable shield unit 11 need not be opened to calibrate the sample in the contained collection vial 12. Instead, the shield unit already includes the detectors 36 and electronic circuitry for measuring the emitted radiation without opening the shield unit. When it is desired to determine the calibration, typically when the sample is to be used for its intended purpose, portable shield unit 11 is set on a base unit 14, the controller unit 16 transmits a signal to initiate the measurement, the radiation is measured within the shield unit, and the measurement data are communicated to the controller unit 16 via the base unit 14 for processing.

Figure 4:
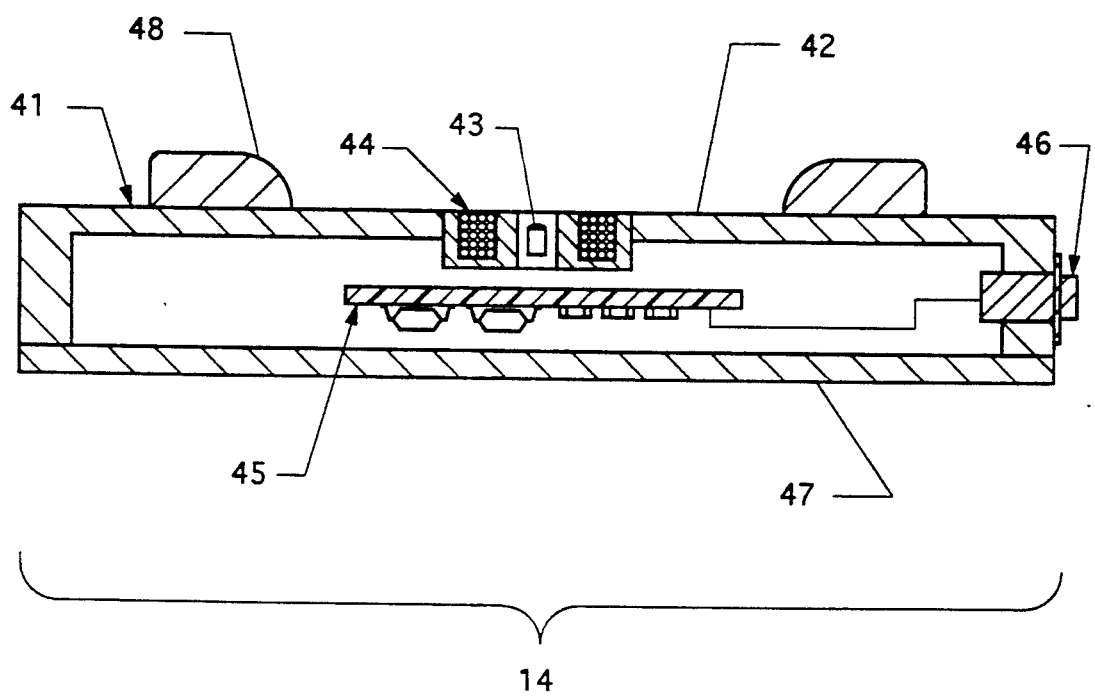
FIG. 4 is a partial cross-sectional view of an embodiment of a calibration station for a portable shield unit.

FIG. 4 shows a cross-sectional view of a modular base unit for use with the portable shield unit of FIG. 2. In the embodiment of FIG. 4 base unit 14 comprises a housing 41, a bottom cover plate 47, and a guide ring 48, which all may be formed of a non-shielding material such as aluminum or plastic. Guide ring 48 defines a receiving area 42 in its interior at the top surface of the housing 41 to receive the portable shield unit. The ring 48 serves to center a portable shield unit 11 as it is set in the receiving area 42. The base unit includes a photodiode 43 which is disposed at receiving area 42 to lie in registration with LED 33 when a shield unit 11 is set on the receiving area. As described below, LED 33 and photodiode 43 optically couple a portable shield unit 11 with base unit 14 for data communications.

It has been found advantageous for calibration station 13 to communicate power to the portable shield units when they are set on the base units. Mounted at receiving area 42 for this purpose as well as for data communications is an inductive coupling mechanism 44. The mechanism 44, like its companion inductive coupling mechanism 34 in the bottom of a portable shield unit, comprises a fifteen-turn wire coil wound on a ferrite pot core. The two mechanisms are positioned to lie in registration with, and in close proximity to, one another when a shield unit is set on a base unit. The two mechanisms taken together form a transformer in which the primary windings are in the base unit and the secondary windings are in the portable shield unit. Data and power are communicated across this transformer as described below. In this way the portable shield units need not carry on-board batteries. This reduces the size and weight of the portable units, avoids the problem of unreliable results as the batteries wear down, obviates the need to replace worn out batteries, and simplifies the unit because a common power supply at the controller unit is used for all portable units. Although less desirable for these reasons, a portable shield unit in this embodiment of the invention may nevertheless be configured with its own on-board power supply. In addition, if wireless communication of power and data is not desired, the portable shield unit and controller unit may alternatively be configured with cable connection ports or other wire connection means instead of the inductive and optical coupling mechanisms. In this alternative embodiment power and data are communicated between the portable shield unit and calibration station over the direct cable connection.

Base unit 14 includes a printed circuit board 45 with circuitry for powering the inductive coupling mechanism and for amplifying signals received by the photodiode 43. An electrical connector 46 is provided for attaching the base unit to the controller unit 16 with a multi-conductor cable. The cable connection carries electrical power and signals of appropriate waveform for the inductive coupling mechanism to the base unit from the controller unit while also carrying the amplified photodiode signal from the base unit to the controller unit and a signal to the ADC unit 60 used to sense the presence of a shield unit.

The system electronics will now be described with reference to FIG. 5, in which the portion of the circuitry contained in portable shield unit 11 is indicated at 51, the portion contained in base unit 14 is indicated at 52, and the portion contained in the controller unit 16 is indicated at 50. Although multiple base units may be connected to the same controller unit, for simplicity the illustrated example shows only a single base unit.

Figure 5:
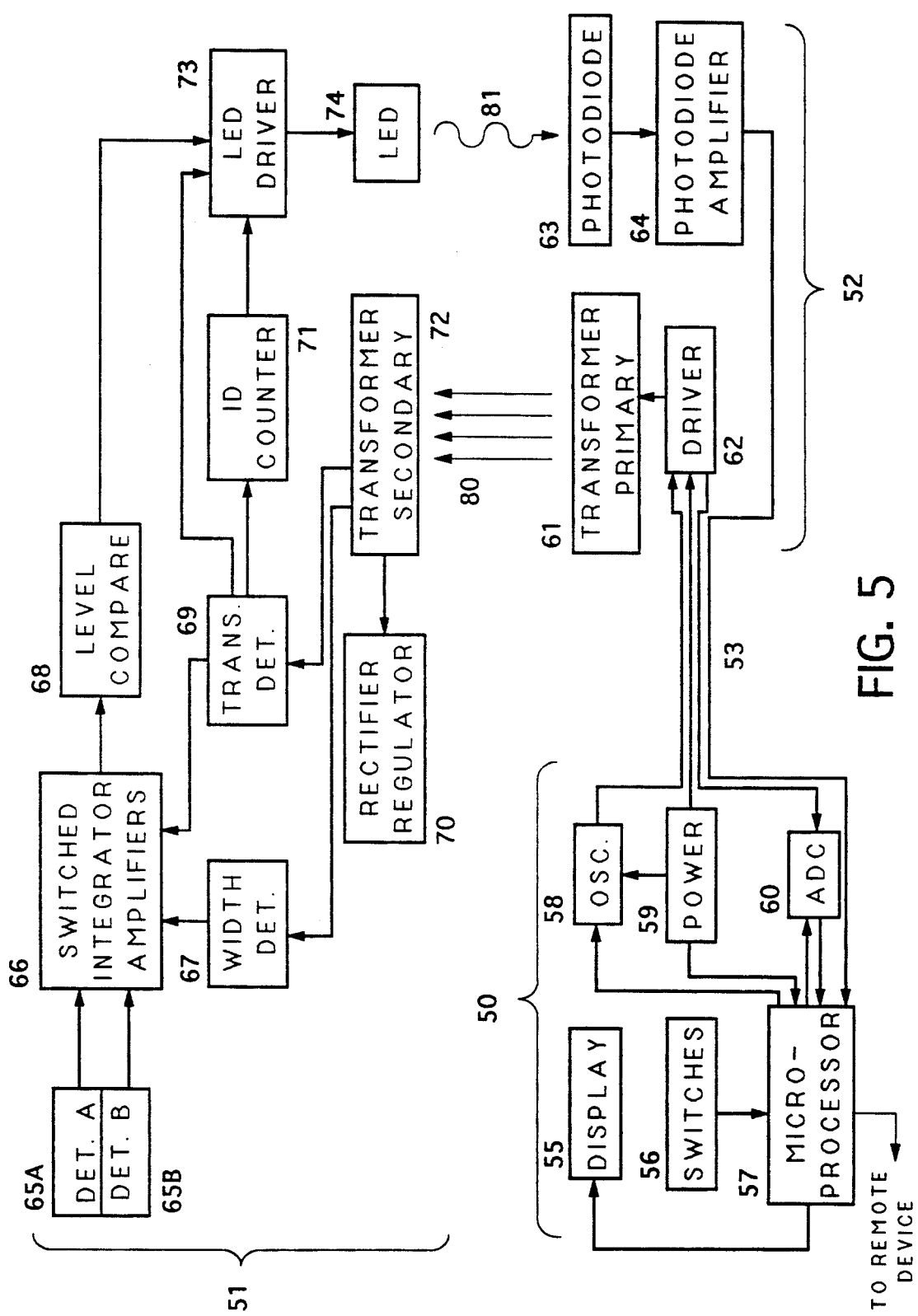
FIG. 5 is a functional block diagram of control electronics for an embodiment of the invention.

In the illustrated embodiment the portable shield unit has only two detectors indicated at 65A and 65B in FIG. 5. A dual channel electronic system is employed, which is capable of independently reading and communicating the results of measurements from the two detectors or detector groups. The controller unit circuitry 50 communicates with the base unit circuitry 52 by way of a multi-conductor cable 53. The portable shield unit receives data by way of magnetic coupling 80 between the transformer primary windings 61 in the base unit and the secondary windings 72 in the portable shield unit. The portable shield unit circuitry 51 communicates with the base unit circuitry 52 via an optical link 81 consisting of LED 74 in the portable shield unit and photodiode 63 in the base unit.

Power for the entire system is supplied by a 120-volt AC line source, which is converted by power supply circuit 59 in the controller unit to a 5-volt DC source to provide power for microprocessor 57 and all other components in the controller and base units and, through the inductive coupling mechanism, the portable shield units. Power supply circuit 59 uses standard subcircuits for the transformer voltage stepdown, diode bridge rectification, filtering, and voltage regulation.

The system is under the control of microprocessor 57 in controller unit 16. The microprocessor controls an alphanumeric display 55, which presents such information as the system status, measurement results, or an options list of operations that the system can perform. An array of switches is provided on the front panel of the controller unit by which the operator may choose an operation from the options list. Microprocessor 57 is configured to perform the following tasks: reading the positions of the front panel switches; sending data via an RS232C port, for example, to a remote device such as a printer or computer; providing real-time clock and calendar data; controlling an oscillator circuit 58 used to communicate with the portable shield unit; controlling an analog-to-digital converter (ADC) 60; and sensing the output of the photodiode 63 (43 in FIG. 4) in the base unit. Configuring a microprocessor to perform these functions is within the routine skill of those skilled in the art of microprocessor control so that further explanation need not be provided here.

Oscillator circuit 5 includes two monostable multivibrator devices and a flip-flop circuit element arranged to produce wave trains with 20-microsecond periods. The flip-flop device is controlled by the microprocessor and is able to produce two slightly different waveforms: A first waveform A is composed of a nominally +8-volt level of 9-microsecond duration followed by zero volts for 11 microseconds, and a second waveform B composed of a +8-volt level of 11-microsecond duration followed by zero volts for 9 microseconds. The oscillator signal is sent via a cable connection 53 to a MOSFET driver device 62 located in the base unit and is used to power the primary side of the transformer 61 formed by the inductive coupling mechanism in the base unit and its companion mechanism 72 in the portable shield unit. The current produced by the driver 62 is sampled under microprocessor control through ADC 60. By monitoring the sampled current, the microprocessor is able to detect when power is being drawn across the inductive coupling mechanism 61 and 72, and hence determine whether a portable shield unit is mounted on the base unit.

The waveform produced at the secondary windings of the transformer in the portable shield unit matches the waveform in the primary. In the portable shield unit the waveform is applied as follows. First, pulse width detector 67 identifies whether the waveform is type A or type B. Second, transition detector circuit 69 detects when the waveform undergoes a transition from one type to the other. Third, rectifier and regulator circuit 70 receives power from the square wave and provides a +5-volt DC source for powering the circuit elements contained in the portable shield unit.

When microprocessor 57 directs the oscillator circuit 58 to switch from one waveform to the other, for instance from B to A, a transition between waveforms occurs at the primary windings of the transformer 61 and hence also at the secondary windings 72. The pulse width detector 67 determines that the new waveform is type A and directs the switched integrator amplifiers 66 to connect detector group A and disconnect group B. The waveform transition detector circuit 69 detects a transition from one waveform to the other and performs the following three simultaneous operations: First, one of the switched integrator amplifiers 66 is directed to begin measurement. Second, LED driver 73, which normally causes LED 74 to be energized, is directed to turn the LED 74 off. This transition of the LED from on to off is referred to here as an INITIATE signal. Third, the shield ID counter circuit 71 is initiated.

Since the apparatus is intended to be used with a plurality of portable shield units 11, provision is made to identify the individual units. This is desirable, for example, so that shield units may be used which employ different detectors, have different sensitivities, or have different geometrical arrangements of the detectors. Through shield ID counter 71 and associated circuitry, the calibration station is able to identify the shield unit and apply calibration parameters specific to that unit in determining calibration levels. Shield ID counter 71 counts the number of pulses in the transformer secondary 72 and compares this number with a value that has been preset through miniature switches located on the PC board 31 in the portable shield unit. The preset switch values may typically range from 1 to 256. When the detected number matches the preset value, the ID counter directs the LED driver 73 to produce a brief 40-microsecond pulse on LED 74. The time interval between the moment the LED is turned off (which moment is marked by the INITIATE signal) and the beginning of this pulse is thus characteristic of the ID number of the particular shield unit. The selection of electrical circuit components to implement these function is within the routine skill of those in the art and need not be described further. The above describes suitable circuitry for determining the presence of a portable shield on a base unit and determining the ID number of the shield unit. Those skilled in the art will recognized that these functions can be performed in a variety of ways using different circuit designs. For the purposes of the present invention such alternative designs are considered to be equivalent to that disclosed herein.

The electrical signals which carry information about the radiation emitted by the sample originate in the detector material 36 in the shield unit. The two detector strips 36 shown in FIG. 2 correspond to blocks 65A and 65B in FIG. 5. The detector material generates a small electrical current under action of the impinging radiation and/or Compton electrons. The current signals from detectors 65A and B are applied in sequence to a switched integrator amplifier 66, which integrates the current signals to determine a corresponding accumulated electric charge value. A suitable integrator amplifier 66 may be provided, for example, by integrated circuit chip number ACF2101BU available from Burr-Brown Corporation. An amplified voltage corresponding to the integrated charge value is produced at the output of the switched integrator amplifier. Level comparator 68 receives the amplified voltage and provides a triggering signal when a preset reference level is reached. The triggering signal is applied to LED driver 73, which then illuminates LED 74. In this arrangement the accumulation of charge in the integrator amplifier 66 is proportional to the integrated dose value at the detector over the integration period. The integration period in turn is equal to the time delay between the INITIATE signal and the moment the comparator 68 triggers. The net result is that the time period from the INITIATE signal until LED 74 is re-illuminated for a second time is equal to the length of the "sampling" period, i.e., the integration period, needed for the accumulated radiation to reach a pre-set level (determined by the reference level of comparator 68).

The emissions from LED 74 are received by photodiode 63 in the base unit, which provides a signal that is amplified by the photodiode amplifier 64 and sent on to an I/O port of microprocessor 57. The microprocessor is configured to record the time at which the LED underwent a transition from "on" to "off" as well as a transition from "off" to "on." In this manner the microprocessor receives information on the length of time for each of the detectors in the shield unit to accumulate a pre-set radiation dose. With this information the microprocessor is able to apply conventional data reduction methods to determine the relative calibration of the sample. The sample calibration information may then be provided on display 55. Specific data reduction techniques and algorithms for computing the calibrations are well known and do not form a part of the present invention, hence are not described here. Prior to calibrating an unknown sample in a portable shield unit, of course, the apparatus must itself be calibrated. This may be accomplished in conventional fashion by measuring known quantities of standard radioactivities in reference samples.

As indicated above, at least two detectors are desirable to average out differences in radiation at the detectors resulting from asymmetries in the sample (in those applications where the magnitudes of such differences are of significance). In one embodiment of the invention the differences may be averaged out simply by wiring the two detectors together and passing the resulting signals through a single integrator amplifier channel. A multichannel integrator amplifier system such as described above, however, may be desirable in a number of situations. For example, the arrangement of detectors may not be sufficient to make corrections of the required accuracy for variations resulting from asymmetrical azimuthal distribution of the liquid sample or variations in liquid volumes and shapes. Detectors of different types or arranged in different configurations, sensitive to different energy ranges, may be incorporated into a single portable shield unit so that a single unit may be used to assay isotopes emitting gamma rays of significantly differing energies. If the range of activities in the samples to be measured is greater than the dynamic range of the measuring circuitry, a portable shield unit may be configured with two or more detector groups, each group being differently configured or the signals they generate being differently processed to account for different portions of the dynamic range. In this way, a trace amount of radioactive contaminant may be measured in the presence of the strong activity of the main sample by employing a first detector or detector group optimized to detect the contaminant while a second detector or detector group is optimized to detect the main sample. In another arrangement the vertical location of the activity in the vial may be of interest, for example, to determine volumes or for making corrections for geometric irregularities. In this situation it may be desirable to employ several detector segments stacked vertically above one another and read each vertical segment through a separate channel. In yet another application, multiple detectors of different types may be employed to measure a sample emitting radiation of different types such as gamma radiation and alpha or beta radiation. Each detector species may be read through a separate channel.

Figure 2A:
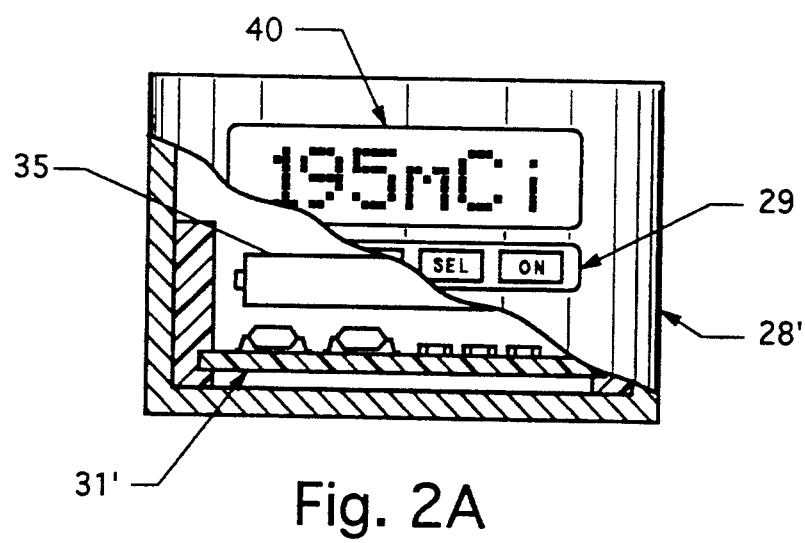
FIG. 2A is a partial cross-sectional view showing an alternative embodiment of the lower housing of the portable shield unit of FIG. 2.

Although the embodiment described above includes a separate and detached calibration station, the benefits of the invention may also be achieved in a self-contained alternative embodiment in which the calibration station is included within the portable shield unit and there is no need for a separate base unit. Such an embodiment is illustrated in FIGS. 2 and 2A, where the lower housing 28 of FIG. 2 is replaced with the lower housing 28' of FIG. 2A. The alternative housing 28' includes a printed circuit board 31' with electronic circuitry as described above but without the need for data communications with a detached base unit. The alternative housing 28' includes an on-board power source such as a battery 35, control switches 29 serving the function of the control switches on controller unit 16 in the previously described embodiment, and a display 40.

The above descriptions and drawings disclose illustrative embodiments of the invention. Given the benefit of this disclosure, those skilled in the art will be able to employ various modifications, alternate constructions, and equivalents achieving the advantages of the invention. For example, the circuitry may be configured in a number of ways without departing from the invention, which is not intended to be limited to the particular method of measuring radiation dose in the portable shield units or the particular scheme for communicating data or power between the shield unit and base unit. The primary limitations on the components of the portable shield unit arise from the need for the shield unit to be portable, i.e., arise from the restrictions on overall size and weight of the unit. Those skilled in the art will be able to substitute other circuit elements for those illustrated here, as well as other constructions for the unit or types of detectors without sacrificing the portability or functionality of the portable shield unit. All such substitutions are considered to be equivalent to their counterpart disclosed here. Moreover, although this invention arose in connection with the practices and procedures followed in the use of medical radioisotopes, those skilled in the art may find the invention to be of benefit in other applications as well. Therefore, the invention is not to be limited to the above description and illustrations, but is defined by the appended claims.

What is claimed is:

1. Apparatus for use in calibrating radioisotopes comprising:
    a hand-holdable portable shield unit dimensioned to be carried about by a user comprising:
        a radiation shielding member formed to contain a vessel holding a radioactive sample for absorbing radiation emitted by said sample;
        at least one radiation detector disposed within said shielding member to detect radiation emitted by said radioactive sample, said at least one detector providing an unprocessed electrical detector signal including a representation of the detected radiation;
        processing electronics coupled to said at least one radiation detector to receive said unprocessed electrical signal for providing a data signal representative of the radiation detected by said at least one detector; and
        first communication means for communicating the data content of said data signal; and
    a calibration station detached from said shield unit comprising:
        second communication means for communicating with said first communication means to receive the data content of said signal;
        data reduction means receiving said data content from said second communication means and determining radiation calibration parameters therefrom; and
        means for providing said radiation calibration parameters to a user.

2. The apparatus of claim 1, comprising at least two detectors uniformly spaced about said vessel.

3. The apparatus of claim 2, consisting of a pair of detectors positioned opposite one another with respect to said vessel and extending beyond the reach of said vessel.

4. The apparatus of claim 3 wherein said detectors are in the form of strips extending vertically above and below said vessel.

5. The apparatus of claim 4, wherein said pair of detectors comprises a semiconductor material responsive to radiation incident from said sample and providing said unprocessed electrical detector signal to said processing electronics representative of said incident radiation.

6. The apparatus of claim 1, wherein said at least one detector comprises a semiconductor material responsive to radiation incident from said sample and providing said unprocessed electrical detector signal to said processing electronics representative of said incident radiation.

7. The apparatus of claim 6, comprising at least two detectors in the form of strips extending vertically at least about the length of said vessel and disposed uniformly about the circumference of said vessel.

8. The apparatus of claim 7 wherein said strips extend above and below the upper and lower extremities of said vessel.

9. The apparatus of claim 6 wherein said radioactive sample emits gamma radiation and said at least one radiation detector further comprises:
    converter means emitting electrons in response to gamma radiation incident thereon from said sample; and
    said semiconductor material is further responsive to said electrons in providing said unprocessed electrical detector signal to said processing electronics.

10. The apparatus of claim 9, comprising at least two detectors in the form of strips extending vertically at least about the length of said vessel and disposed uniformly about the circumference of said vessel.

11. The apparatus of claim 10 wherein said strips extend above and below the upper and lower extremities of said vessel.

12. The apparatus of claim 1 wherein said first and second communication means comprises an optical coupling between said portable shield unit and said calibration station for data communications.

13. The apparatus of claim 1 wherein said portable shield unit includes no self-contained source of electrical power for said processing electronics, and said portable shield unit and said calibration station further comprise means for communicating power from said calibration station to said portable shield unit during calibration.

14. The apparatus of claim 13 wherein said means for communicating power comprises an inductive coupling between said portable shield unit and said calibration station for power communications.

15. The apparatus of claim 14 further comprising means for providing a waveform to said inductive coupling, said waveform carrying power to said portable shield unit and also carrying information to said processing electronics to cause said processing electronics to provide said representative data signal.

16. The apparatus of claim 13 wherein said portable shield unit and said calibration station are in wireless communication with one another for both data and power communications.

17. The apparatus of claim 1 comprising at least two radiation detectors and wherein said processing electronics provides a plurality of data signals corresponding in number to the number of said detectors, said data signals being representative of the radiation detected independently by each detector.

18. A self-contained hand-holdable portable apparatus for use in calibrating radioisotopes comprising:
a housing dimensioned to be carried about by a user;
a shield unit contained within said housing and comprising:
a radiation shielding member formed to contain a vessel holding a radioactive sample for absorbing radiation emitted by said sample; and
at least one radiation detector disposed within said shielding member to detect radiation emitted by said radioactive sample, said at least one detector providing an unprocessed electrical detector signal including a representation of the detected radiation;
said housing further containing processing electronics coupled to said at least one radiation detector to receive said unprocessed electrical signal for providing a data signal representative of the radiation detected by said at least one detector;
a calibration station comprising data reduction means receiving the data content of said data signal and determining radiation calibration parameters therefrom;
means for providing said radiation calibration parameters to a user; and
a power source providing power for operation of said apparatus.

* * * * *